(12) United States Patent
Vidal et al.

(10) Patent No.: US 9,116,802 B2
(45) Date of Patent: Aug. 25, 2015

(54) DIAGNOSTIC NOTIFICATION VIA PACKAGE UPDATE MANAGER

(75) Inventors: Seth Kelby Vidal, Raleigh, NC (US); James Antill, Bristol, CT (US)

(73) Assignee: Red Hat, Inc., Raleigh, NC (US)

(*) Notice: Subject to any disclaimer, the term of this patent is extended or adjusted under 35 U.S.C. 154(b) by 238 days.

(21) Appl. No.: 12/714,258

(22) Filed: Feb. 26, 2010

(65) Prior Publication Data
US 2011/0214018 A1 Sep. 1, 2011

(51) Int. Cl.
G06F 11/00 (2006.01)
G06F 11/07 (2006.01)
G06F 9/445 (2006.01)

(52) U.S. Cl.
CPC ........ G06F 11/0751 (2013.01); G06F 11/0715 (2013.01); G06F 8/65 (2013.01); G06F 11/0766 (2013.01)

(58) Field of Classification Search
CPC .............. G06F 11/008; G06F 11/3452; G06F 11/1433; G06F 8/60; G06F 8/71; G06F 9/524; G06F 11/079; G06F 11/0793; G06F 17/3023; G06F 17/30233; G06F 17/3056; G06F 8/61; G06F 8/65
USPC .................. 714/26, 27, 38.1, 38.14
See application file for complete search history.

(56) References Cited

U.S. PATENT DOCUMENTS

| | | | |
|---|---|---|---|
| 6,438,749 B1 | 8/2002 | Chamberlain | |
| 7,120,684 B2 * | 10/2006 | Lawing et al. | 709/223 |
| 7,240,336 B1 * | 7/2007 | Baker | 717/135 |
| 7,512,939 B2 * | 3/2009 | Brookner | 717/170 |
| 7,624,393 B2 * | 11/2009 | Egan et al. | 717/173 |
| 7,657,885 B2 * | 2/2010 | Anderson | 717/170 |
| 7,836,341 B1 * | 11/2010 | Krishnan | 714/26 |
| 2003/0051235 A1 | 3/2003 | Simpson | |
| 2003/0229890 A1 * | 12/2003 | Lau et al. | 717/168 |
| 2005/0210459 A1 | 9/2005 | Henderson et al. | |
| 2006/0190773 A1 | 8/2006 | Rao et al. | |
| 2006/0230398 A1 * | 10/2006 | Yokota | 717/174 |
| 2007/0038991 A1 | 2/2007 | Schuft et al. | |

(Continued)

OTHER PUBLICATIONS

Seth Kelby Vidal, "Systems and Methods for Initiating Software Repairs in Conjuction With Software Package Updates", U.S. Appl. No. 12/714,200, filed Feb. 26, 2010.

(Continued)

*Primary Examiner* — Bryce Bonzo
*Assistant Examiner* — Elmira Mehrmanesh
(74) *Attorney, Agent, or Firm* — Lowenstein Sandler LLP

(57) ABSTRACT

Embodiments relate to systems and methods for diagnostic notification via a package update manager. A physical or virtual client machine can host a set of installed software packages, including operating system, application, and/or other software. A package manager tracks the set of installed packages and updates available for the installed set. A notification tool, in conjunction with the package manager, can monitor the user's selection of package update options, and compare those updates to a diagnostic database and/or current state of the client machine. Based on those determinations, the notification tool can generate notifications to the user advising them of potential conflicts, faults, or other conditions that may arise due to, or may surround, the prospective package update. The notification can permit the user to continue or terminate selected updates, and the notification tool can re-analyze any potential faults after an update is completed.

19 Claims, 4 Drawing Sheets

(56) References Cited

U.S. PATENT DOCUMENTS

| | | | |
|---|---|---|---|
| 2007/0157192 A1 | 7/2007 | Hoefler et al. | |
| 2007/0169075 A1 | 7/2007 | Lill et al. | |
| 2008/0028392 A1* | 1/2008 | Chen et al. | 717/175 |
| 2008/0134165 A1* | 6/2008 | Anderson et al. | 717/173 |
| 2008/0141240 A1 | 6/2008 | Uthe | |
| 2008/0201705 A1 | 8/2008 | Wookey | |
| 2009/0013319 A1 | 1/2009 | Williams et al. | |
| 2009/0037897 A1* | 2/2009 | Dull et al. | 717/168 |
| 2009/0300595 A1 | 12/2009 | Moran et al. | |
| 2010/0023933 A1* | 1/2010 | Bryant et al. | 717/168 |
| 2010/0058308 A1* | 3/2010 | Demshur et al. | 717/168 |
| 2010/0058314 A1 | 3/2010 | Wang | |
| 2010/0083243 A1* | 4/2010 | Mincarelli et al. | 717/173 |

OTHER PUBLICATIONS

Seth Kelby Vidal, "Systems and Methods for Managing Versions of Software Packages", U.S. Appl. No. 13/037,363, filed Mar. 1, 2011.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methods for Generating and Storing Translation Information as Package Metadata", U.S. Appl. No. 12/714,171, filed Feb. 26, 2010.

Seth Kelby Vidal, "Systems and Methods for Generating Predictive Diagnostics via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Generating Package Profiles in Software Package Repositories Using Selective Subsets of Packages", U.S. Appl. No. 12/873,557, filed Sep. 1, 2010.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

DIAGNOSTIC NOTIFICATION VIA PACKAGE UPDATE MANAGER

FIELD

The present teachings relate to systems and methods for diagnostic notification via a package update manager, and more particularly to platforms and techniques for conducting general diagnostic inspections of client or target machines configured to receive a package update by inspecting the state of processes, storage, services, and/or other resources on the participating machine, comparing the resource state of that machine to conditions reflected in a debugging database, and generating corresponding notifications about irregular or faulty software or other conditions on the machine, before, during, or after package installation.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum"(Yellowdog update manager) package update manager available from Red Hat Inc., and others. In general, available software package managers are configured to interact with the set of installed packages on a client and with one or more software package repositories, to directly connect to those databases and download available package updates.

The process of initiating software package updates can involve, however, the risk or possibility of software-related faults, instabilities, bugs, or other undesirable errors or conditions. A number of those potential faults or irregular conditions can have a tendency to occur during the window of time in which package updates are made. For instance, a user who repeatedly downloads and installs updates for a variety of unrelated packages may incur the risk of overwriting copies of files with inconsistent or undesired versions of those files. For further instance, a user may choose to initiate a package update process without fully verifying or validating the source of the package update files, and retrieve and install those files without any virus scans, black-list check, or other security measures. Because existing package update managers are not configured to conduct broader system-wide inspections to scan for conditions that could lead to complications, the package update process can involve unintended conflicts, faults or other problems whose potential could be enhanced during the updating process. It may be desirable to provide systems and methods for diagnostic notification via a package update manager, in which diagnostic logic and user notification can be integrated into the package update process to detect and possibly correct potentially problematic updates and/or other system conditions.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for diagnostic notification via a package update manager. More particularly, embodiments related to platforms and techniques for monitoring the process of procuring and initiating software package updates, and identify potential conflicts, bugs, faults, and/or other undesired conditions that may arise during or surrounding the update process. In aspects, a package manager can track and manage the installation of one or more software packages and/or updates to those packages (which may be referred to together as a "software package update") on a client, host, target, and/or other machine. The package manager can host or interact with a notification tool containing logic, to trace the identifies of the software package updates, and to communicate with a diagnostic database. The diagnostic database can contain information, links, and other data to flag or identify potential conflicts, bugs, faults, and/or other conditions based on the selected updates, the state of client resources, and/or other variables. The notification tool can inspect or record any potential conflicts, bugs, faults, and/or other conditions and generate a notification to the user of those potential package installation issues. In aspects, a user can then confirm, discontinue, change, or otherwise process their package update activity. These and other embodiments described herein address the various noted shortcomings in known package update technology, and provide a user with enhanced package and system management capability for installing their software package resources with less potential for software conflicts, errors, or other undesirable results of updating activity.

Reference will now be made in detail to exemplary embodiments of the present teachings, which are illustrated in the accompanying drawings. Where possible the same reference numbers will be used throughout the drawings to refer to the same or like parts.

Figure 1:
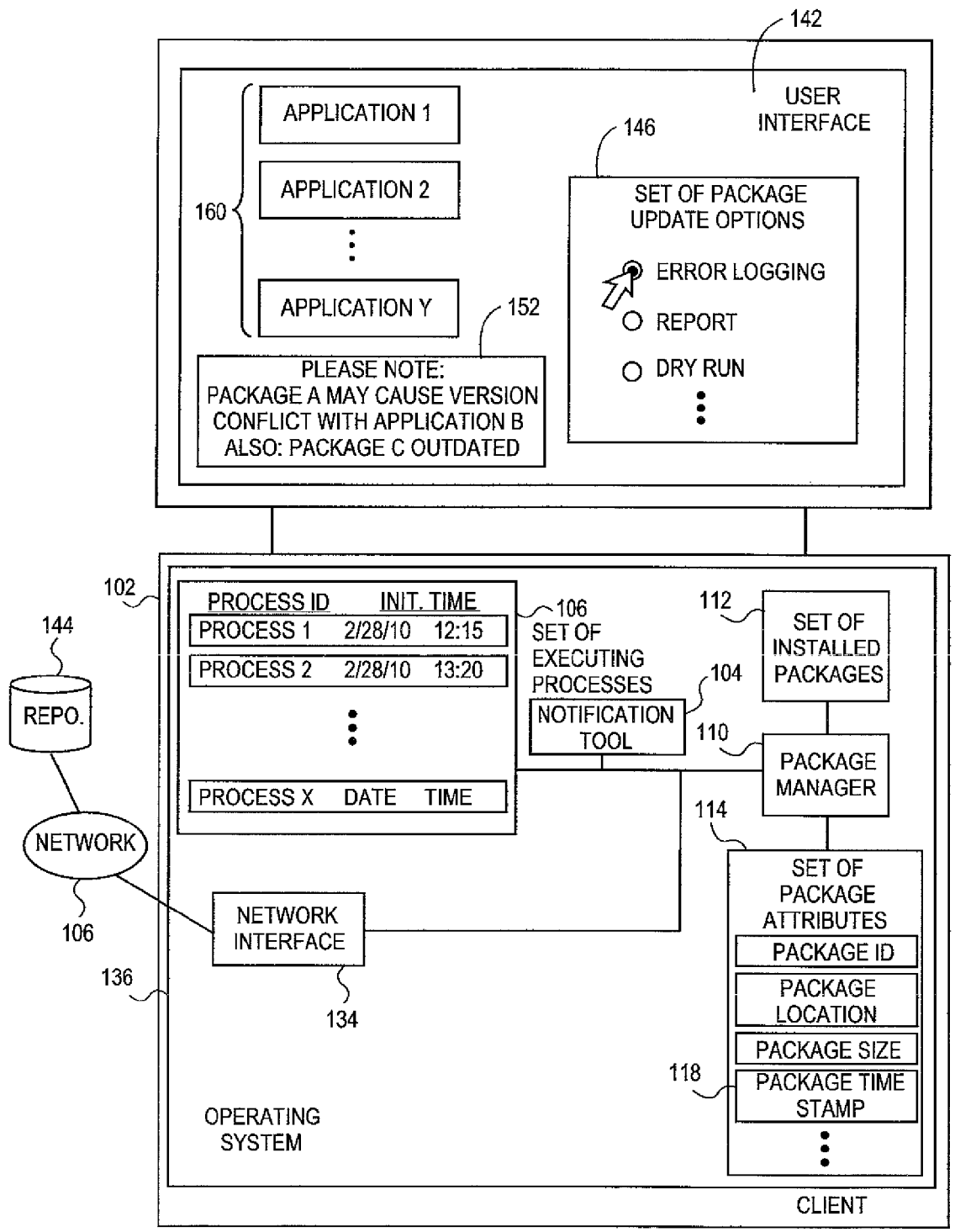
FIG. 1 illustrates an overall network in which systems and methods for diagnostic notification via a package update manager can be implemented, according to various embodiments.

FIG. 1 illustrates an exemplary system 100 in which systems and methods for diagnostic notification via a package update manager can be implemented, according to various embodiments. In embodiments as shown, a client 102 can store, execute, and otherwise host a variety of resources including a package manager 110 configured to communicate with a set of installed packages 112, and other hardware, software, and resources. In embodiments, package manager 110 can be or include a software application, a utility, an application programming interface (API) to an operating system 136 of client 102, a service, and/or other local or remote logic or resources. According to embodiments, in package manager 110 can access and manage set of installed packages 112 to run, edit, update, configure, and otherwise manage one or more software packages hosted or installed in client 102. In aspects, package manager can be or include one or more commercially and/or publicly available package manager applications or resources, such as the "yum" package update manager available from Red Hat Inc. based on or compatible with the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications or utilities, and can in aspects include an operating system, drivers, and/or components thereof. Set of installed packages 112 can have an associated set of package attributes 114 which records file names, versions, dates, software requirements, an/or other attributes related to the software package updates installed on client 102 and reflected in set of installed software packages 112.

In aspects, package manager 110 can communicate with a network interface 134 configured to connect to one or more network 106, such as the public Internet or other public or private networks. Package manager 110 can thereby connect to one or more package repository 144 hosting software packages including software package updates, and/or other software or resources.

In aspects, package manager 110 can interact with set of installed packages 112 and one or more package repository 144 via set of communication pipes 104 to configure, test, update, and/or otherwise manage set of installed packages 112 operating on client 102. Package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform to select packages for installation and/or update, installation options, and/or other options or parameters for the downloading of package updates from one or more package repositories to set of installed packages 112. In aspects, package manager 110 can also communicate with a notification tool 104 hosted on client 102, to monitor package installation activity, and generate predictive and/or post-installation reports and notifications regarding the compatibility, fault status, or other conditions of package update activities conducted on client 102. By examining prospective and/or installed package updates and associated resources during, or before or after the download activity at a time surrounding the update event(s), a user can be apprised of potential faults or other conditions that might be caused by potential or actual software packages activity. Notification tool 104 can generate and deliver those notification(s) at a time when the user may have the greatest chance of intervening to review the package download, client settings and resource states and other resources, to debug and possibly correct the notified conditions. In aspects, the notification tool 104 can contain or access diagnostic logic to examine data generated or hosted by various resources, including set of installed packages 112, operating system 136, one or more repository 144, and others to generate one or more user notification 152 and other output, to support and manage package update and installation activities.

Figure 2:
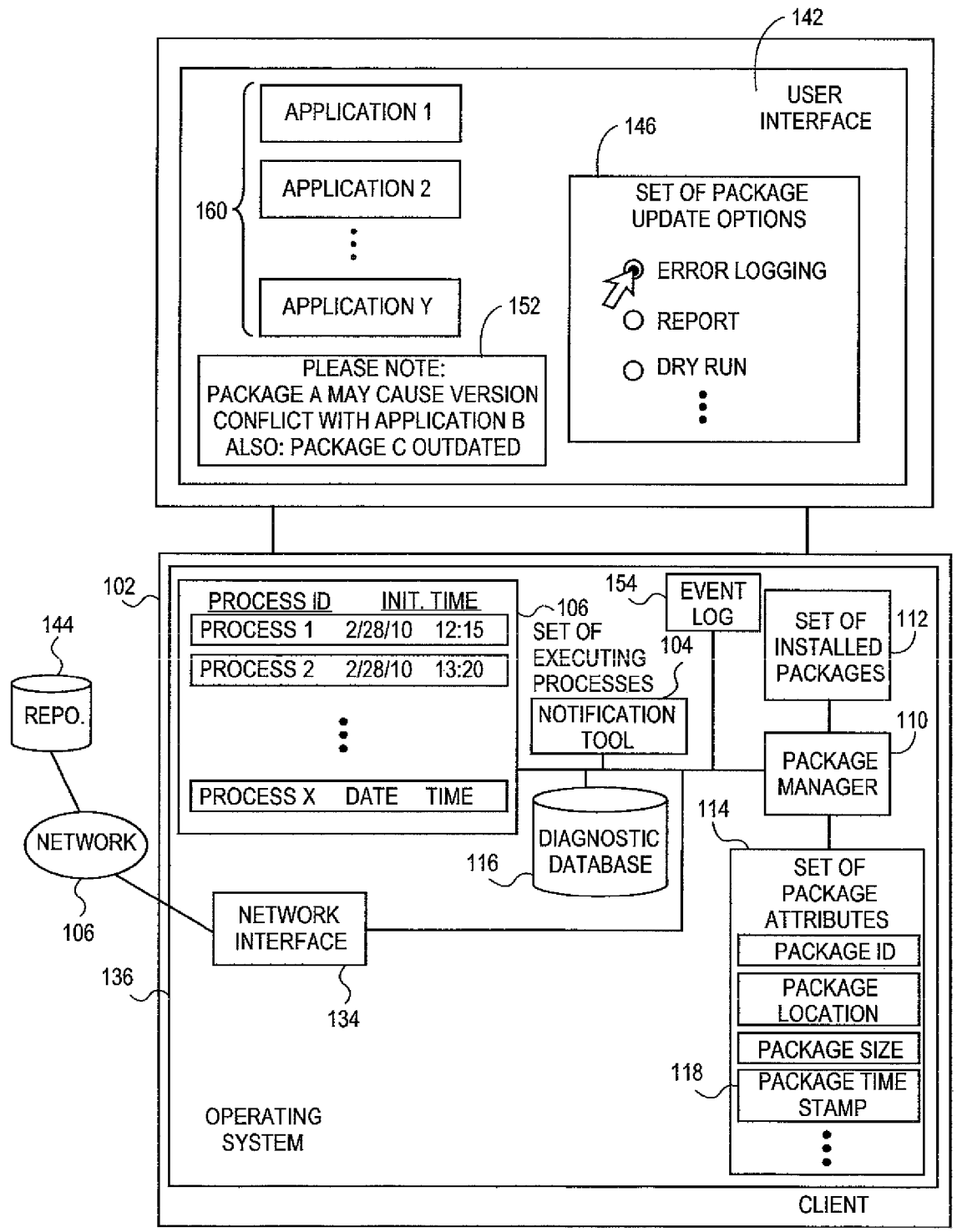
FIG. 2 illustrates an overall network in which for systems and methods for diagnostic notification via a package update manager can be implemented, according to various embodiments in further regards.

As illustrated for example more particularly in FIG. 2, package manager 110 can connect to one or more package repository 144 via one or more network 106. Package manager 110 can present and manage set of update options 146 to initiate and conduct download activity, for instance to initiate the download of one or more package update 150. In conjunction with those activities, notification tool 104 can examine the user's selected packages, options, and other settings for download and installation, and generate a notification 152 to indicate one or more conditions related to the package activity and status of client 102. Notification tool 104 can maintain and/or access a diagnostic database 116 to identify faults, errors, and/or other conditions which will be notified to the user or other party via notification 152 and/or other communication.

Notification tool 104 can, for instance, access an event log 154 maintained or generated by operating system 136 to determine any recent process-related or other events or conditions associated with the resources of client 102, that may present an issue for the downloading or installation of one or more package update 150. For instance, event log 154 or other records may indicate that client 102 contains a certain amount of storage or memory resources, which resources may or may not permit the proper installation of one or more package update 150. For instance, notification 152 generated by notification tool 104 can indicate or report to the user indications such as the number or type of plug-ins installed in client 102, the total number of packages installed in client 102, the amount of up-time recorded for client 102, a record of conditions such as "-force" and/or "no-deps" located in a a "~/.bash history" directory, and/or the status or condition of other resources on client 102. For further example, notification 152 can contain information regarding the activation and/or disablement of various services or utilities on client 102, such as gpg signature checking or other security features, as well as the number, location, type, and/or other attributes of repositories enabled for update activity on client 102. Notification 152 can likewise contain warnings or indications regarding the number and/or identity of various versions of application or operating system software. Other types of conditions related to the state of client 102 and its resources, as well as set of installed packages 112 and other resources, can be identified and reported to the user via one or more notification 152. Due in some regards to the inspection of the resource "health" of client 102 at or around the time that package update activity takes place, the user may have an enhanced ability to avoid faults or other complications related to or caused by attempted package updates, installations, and/or configurations. It may be noted that notification tool 104 can, in aspects, analyze client 102 and target package files and/or other resources before, during, and/or after actual download and/or installation of one or more package update 150. It may also be noted that according to aspects, notification tool 104 can identify and generate notifications automatically, and/or, can generate notification, repair, and/or other activity based on user configuration settings, such as selections to display or suppress the display of selected notifications, and/or to automatically perform selected repair actions or other processes, as described herein.

According to aspects, notification tool 104 and/or other logic can examine prospective update activity, and generate one or more notification 152 on a predictive basis, before the user has downloaded and/or installed one or more package update 150. In a pre-download or pre-installation stage, notification tool 104 and/or other logic can, for instance, analyze resource constraints on client 102 prior to downloading and/or updating any package update(s) and/or associated files, such as memory, storage, security, and/or other constraints that may determine what package(s) client 102 can or can not accept. For instance, one or more package update 150 that requires more storage than client 102 has available can be notified via notification 152. When generating predictive notifications, notification tool 104 can likewise access other data resources, such as diagnostic database 116, which may contain for instance reports or lists of software package update versions which are known to be incompatible with other software, such as applications or operating systems and/or versions thereof. It may be noted that in aspects, diagnostic database 116 can likewise contain executable code and/or other resources for performing diagnostic tests, in addition to or instead of bug lists or other data. Other data can be examined by notification tool 104 to generate one or more notification 152 on a pre-download and/or pre-installation basis. Conversely, notification tool 104 can also or instead generate one or more notification 152 after installation of one or more package update 150 to set of installed packages 112 of client 102. According to aspects, in addition to or instead of the types of data analyzed on a predictive basis, in this case notification tool 104 can examine data such as lists or records of executing processes on client 102 via operating system 136 and/or other resources, to determine, for instance, whether an installed package and/or one or more of its executable files has caused or experienced a fault state, such as a conflict, hang, and/or other condition. In aspects, notification tool 104 can probe and identify conflicts with other software and/or hardware executing or running on client 102, to determine fault conditions that may arise after an installed package (and/or update) begins to run. The status or condition of other hardware, software, services, and/or other resources can be examined during either a pre-download, pre-installation, and/or post-installation stage of package update activities.

In aspects, instead and/or in addition to performing an analysis and identification of potential faults or other conditions in the hardware, software, services, and/or other state of the resources of client 102, notification tool 104, package manager 110, and/or other logic can generate one or more software repair actions in response to the detected state of client 102 and its set of installed packages 112 and/or other resources. In aspects, notification tool 104 can for instance detect and identify one or more corrupted, damaged, and/or missing files in connection with one or more package update 150, and/or other files. In instances where a damaged or missing file or files is discovered, notification tool 104 can initiate a downloading and re-installation of that missing file or files. Replacement files can for instance be accessed and/or downloaded from one or more repository 144, and/or from other data stores, locations, or sites. In aspects, notification tool 104 and/or other logic can detect or identify other conditions requiring or permitting software re-installation or other repair. For example, notification tool 104 can determine that an identified file is located on client 102, but is stored in an incorrect location on that machine, such as for example in an incorrect directory or library. In cases of incorrect file locations or storage, notification tool 104 and/or other logic can transfer and/or copy the incorrectly stored file to a correct location. Notification tool 104 and/or other logic can for instance interact with operating system 136 to effect a copy or move command, to place the subject file in a different directory, library, and/or other location or destination.

Notification tool 104 and/or other logic can perform other software repair activities in connection with actual or prospective package download activity. For example, notification tool 104 and/or other logic can perform version control to ensure that the versions of any of one or more package update 150, set of installed packages 112, operating system 136, and/or other applications, drivers, utilities, and/or other software conforms to versions necessary or compatible with proper operation of client 102. In aspects, notification tool 104 and/or other logic can perform version management by accessing remote stored databases and/or other sites which record compatibility lists or records for operating system, application, and/or other software. In connection with any software repair activity, notification tool 104 and/or other logic can also inspect local resources of client 102, such as operating system 136, including its registry or other components. In aspects, notification tool 104 and/or other logic can perform one software repair or correction, or, can perform a series or sequences of repair actions or corrections. In embodiments where multiple corrections are performed, notification tool 104 and/or other logic can re-test client 102, set of installed packages 112, and/or resources of client 102 to determine the set of changes caused by the repair action, and possibly modify any additional repair actions that may be required.

Figure 3:
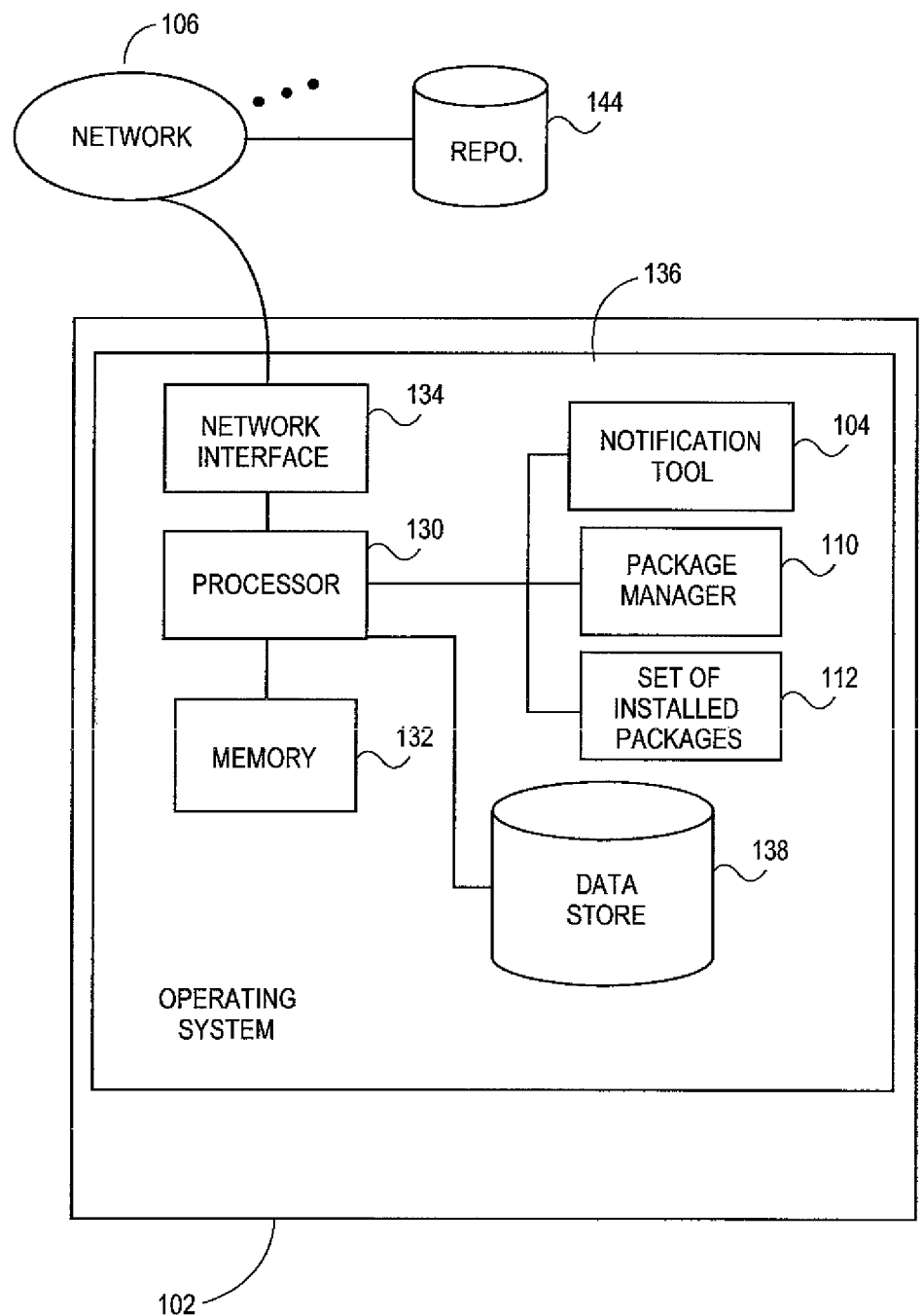
FIG. 3 illustrates exemplary hardware and other resources of a client machine that can be used in systems and methods diagnostic notification via a package update manager, according to various embodiments.

FIG. 3 illustrates an exemplary diagram of hardware and other resources that can be incorporated in a client 102 configured to manage, analyze, test and configure a set of installed packages 112 and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with notification tool 104, package manager 110, and/or other resources to execute control logic and control the updating, installation, analysis and management of software packages and their associated processes. Other configurations of client 102, including processor and memory resources, associated network connections, and other hardware and software resources are possible.

Figure 4:
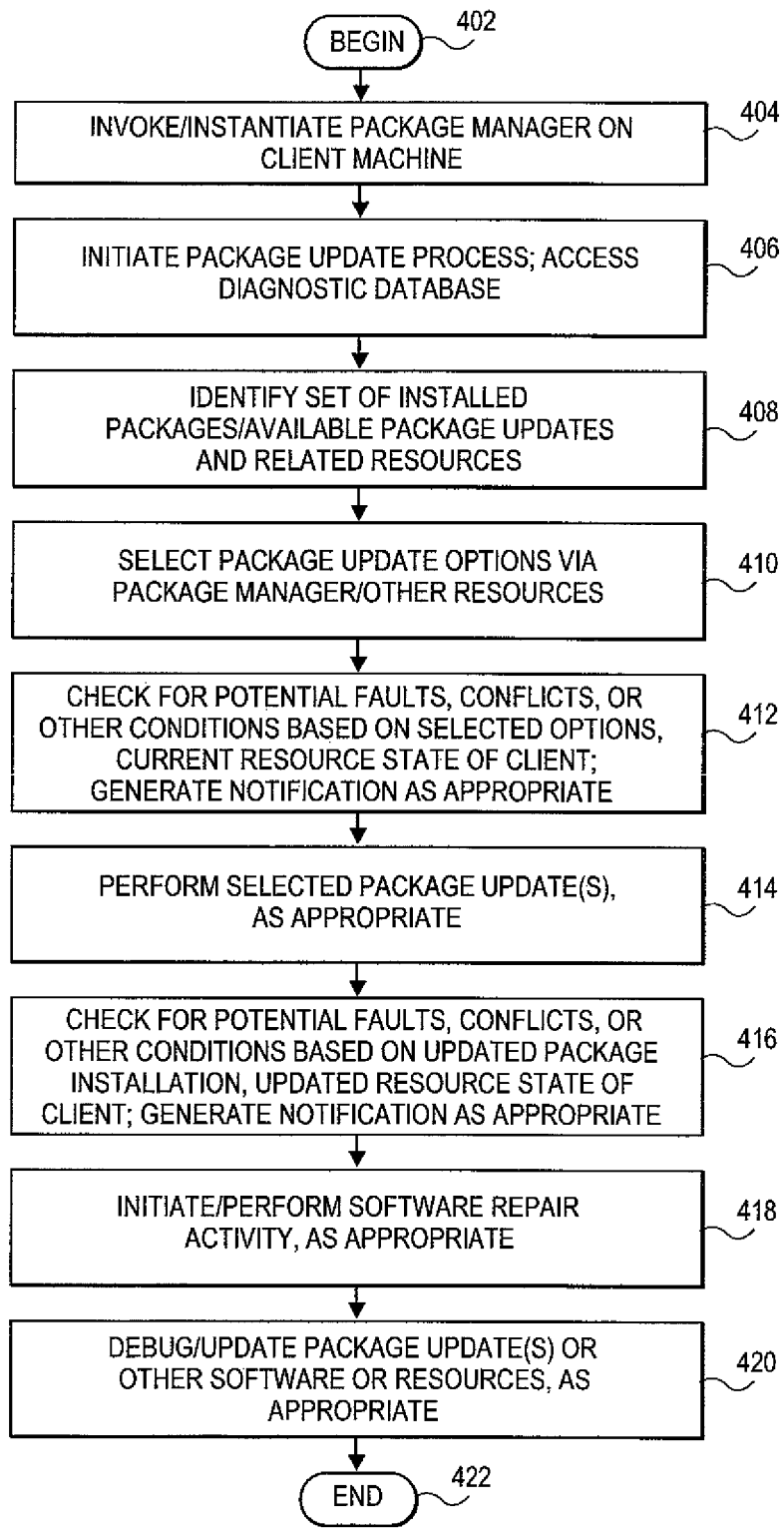
FIG. 4 illustrates a flowchart of software package update management and detection of system conditions that can be used in systems and methods for diagnostic notification via a package update manager, according to various embodiments.

FIG. 4 illustrates overall processing to track, monitor, and manage software package updates and associated client system conditions, according to various embodiments. In 402, processing can begin. In 404, a user can invoke or instantiate package manager 110 on client 102 to perform software package update maintenance, testing, and other management activity. In 406, a user can initiate package update processing or related activity via package manager 110 and/or other logic.

In 408, package manager 110 can identify a set of installed software packages 112 hosted in client 102, for instance, by calling an application programming interface (API) of operating system 136 of client 102 to enumerate installed packages and related resources, such as files, directories, and/or other resources. Package manager 110 can in addition or instead identify available package updates via communication with one or more repository 144 hosting one or more sets of software package updates for application, operating system, and/or other software. In 410, a user can select one or more package update options via package manager 110 and/or or other resources, such as to select, for instance, the name or version of a software package to download and install on client 102, the time of that installation, any security features to be used for that update activity, and/or other configuration options.

In 412, notification tool 104, package manager 110, and/or other logic can check for potential faults, conflicts, bugs, and/or other conditions that may occur or develop upon downloading software package(s) based on the selected download options, the current state of the resources of client 102, and/or other factors. For instance notification tool 104, package manager 110, and/or other logic package can determine that the existence or location of a file, library, or directory reflected in the pending, but not yet performed, package update does not match download option information, directories currently maintained by client 102, and/or other data or specifications. In aspects, notification tool 104 can generate a notification to the user of any potential conflicts, faults, and/or other conditions or information, as appropriate. For instance, notification tool can 104 can generate a list of potentially fault-inducing files or packages, and present the user with a checklist of files or packages to include or exclude from the updating event. Other notifications are possible.

In 414, package manager 110 can perform any selected package package updates selected by the user after receiving any notifications, as appropriate. In 416, notification tool 104, package manager 110, and/or other logic can check for potential faults, conflicts, bugs, and/or other conditions based on the updated package installation, updated state of resources on client 102, and/or other factors or data. In 418, notification tool 104 and/or other logic can initiate and/or perform software repair activity, such as replacing, updating, and/or moving missing, damaged, and/or outdated files, including files in set of installed packages 112 or otherwise. In 420, the user can use package manager 110, notification tool 104, and/or other logic to debug, configure, further update, and/or otherwise manipulate or manage the set of installed packages 112, as appropriate. In 422, processing can return to a prior processing point, jump to a further processing point, or end.

The foregoing description is illustrative, and variations in configuration and implementation may occur to persons skilled in the art. For example, while embodiments have been described in which a unitary package manager 110 is configured to control package update activity, in embodiments, multiple applications or software can interact to control the downloading, installation, testing, and other management of software packages. For further example, while embodiments have been described in which package update activity is conducted on one client 102, in embodiments, multiple local or remote targets, clients, and/or other machines can register to package manager 110 and/or other logic or resources to receive or perform package update activity. Similarly, while embodiments have been described in which one diagnostic database 116 is accessed by notification tool 104, package manager 110, and/or other logic to identify potential faults or issues, in embodiments, multiple diagnostic or debugging databases can be used. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   identifying a set of installed software packages on a client;
   identifying a set of package updates available to update the set of installed software packages on the client;
   identifying, using a processor, a potential fault condition related to a prospective installation of the set of package updates on the client by accessing a diagnostic database; and
   generating a notification to a user of the client of the potential fault condition, wherein the notification comprises a set of selections to accept or decline continued execution of an executing process on the client associated with the identified potential fault condition.

2. The method of claim 1, wherein identifying the potential fault condition comprises accessing a state of the client machine.

3. The method of claim 2, wherein accessing the state of the client machine comprises accessing an event log generated by an operating system of the client machine.

4. The method of claim 2, wherein the state of the client machine comprises at least one of a state of executing processes on the client machine, a memory state of the client machine, a processor state of the client machine, a communications state of the client machine, or a storage state of the client machine.

5. The method of claim 1, wherein the potential fault condition comprises at least one of a package version fault, a file version fault, a directory fault, a library fault, a memory fault, or a security fault.

6. The method of claim 1, further comprising initiating an additional set of package updates to generate a modified set of installed packages on the client.

7. The method of claim 6, wherein the initiating of the additional set of package updates to generate a modified set of installed packages on the client comprises accessing a remote repository to download the set of package updates.

8. The method of claim 6, further comprising:
   identifying an additional potential fault condition related to the modified set of installed packages by accessing a diagnostic database; and
   generating a notification to a user of the client of the additional potential fault condition in view of the modified set of installed packages.

9. The method of claim 1, wherein the client comprises at least one of a virtual machine or a physical machine.

10. A system comprising:
    a memory comprising a set of installed software packages on a client; and
    a processor operatively coupled to the memory, the processor to:
       identify a set of installed software packages on a client,
       identify a set of package updates available to update the set of installed software packages on the client,
       identify a potential fault condition related to a prospective installation of the set of package updates on the client by accessing a diagnostic database, and
       generate a notification to a user of the client of the potential fault condition, wherein the notification comprises a set of selections to accept or decline continued execution of an executing process on the client associated with the identified potential fault condition.

11. The system of claim 10, the processor to identify the potential fault condition by accessing a state of the client machine.

12. The system of claim 11, the processor to access the state of the client machine by accessing an event log generated by an operating system of the client machine.

13. The system of claim 11, wherein the state of the client machine comprises at least one of a state of executing processes on the client machine, a memory state of the client machine, a processor state of the client machine, a communications state of the client machine, or a storage state of the client machine.

14. The system of claim 10, wherein the at least one potential fault condition comprises at least one of a package version fault, a file version fault, a directory fault, a library fault, a memory fault, or a security fault.

15. The system of claim 10, the processor to initiate an additional set of package updates to generate a modified set of installed packages on the client.

16. The system of claim 15, the processor to initiate the additional set of package updates to generate a modified set of installed packages on the client by accessing a remote repository to download the set of package updates.

17. The system of claim 15, the processor to:
identify an additional potential fault condition related to the modified set of installed packages by accessing a diagnostic database, and
generate a notification to a user of the client of the additional potential fault condition in view of the modified set of installed packages.

18. The system of claim 10, wherein the client comprises at least one of a virtual machine or a physical machine.

19. A non-transitory computer readable medium comprising instructions for causing a processor to:
identify a set of installed software packages on a client;
identify a set of package updates available to update the set of installed software packages on the client;
identify, by the processor, a potential fault condition related to a prospective installation of the set of package updates on the client by accessing a diagnostic database; and
generate a notification to a user of the client of the potential fault condition, wherein the notification comprises a set of selections to accept or decline continued execution of an executing process on the client associated with the identified potential fault condition.

* * * * *